United States Patent [19]

Gallo

[11] Patent Number: 4,481,732
[45] Date of Patent: Nov. 13, 1984

[54] FRESH FLOWER HOLDER

[76] Inventor: Joseph S. Gallo, 58 Peach St., Walpole, Mass. 02081

[21] Appl. No.: 543,915

[22] Filed: Oct. 20, 1983

Related U.S. Application Data

[63] Continuation of Ser. No. 337,539, Jan. 7, 1982, abandoned.

[51] Int. Cl.³ .............................................. A01G 5/00
[52] U.S. Cl. ..................................................... 47/55
[58] Field of Search ......................... 47/55, 81, 62, 77

[56] References Cited

U.S. PATENT DOCUMENTS

| | | | |
|---|---|---|---|
| 3,150,462 | 9/1964 | Gallo | 47/55 |
| 3,321,866 | 5/1967 | Gallo | 47/55 |
| 3,553,889 | 1/1971 | Gallo | 47/55 |
| 4,281,474 | 8/1981 | Gallo | 47/58 |
| 4,291,496 | 9/1981 | Click | 47/55 |
| 4,403,446 | 9/1983 | Wolfe et al. | 47/62 |

FOREIGN PATENT DOCUMENTS 922107  3/1973  Canada ..................................... 47/77

Primary Examiner—James R. Feyrer

[57] ABSTRACT

A holder for a fresh flower or bud from which the stem has been severed, the holder including a covered wire, a portion of absorbent material surrounding an intermediate portion of the covered wire to form a moisture reservoir, and a water-repellent covering surrounding the absorbent material and extending down the length of the stem, wherein the absorbent material comprises a plug of fibers in which the fibers extend predominantly parallel to the covered wire to permit insertion of the severed end of the flower into the plug so as to keep the flower from breaking its moisture-supplying contact with the plug.

8 Claims, 5 Drawing Figures

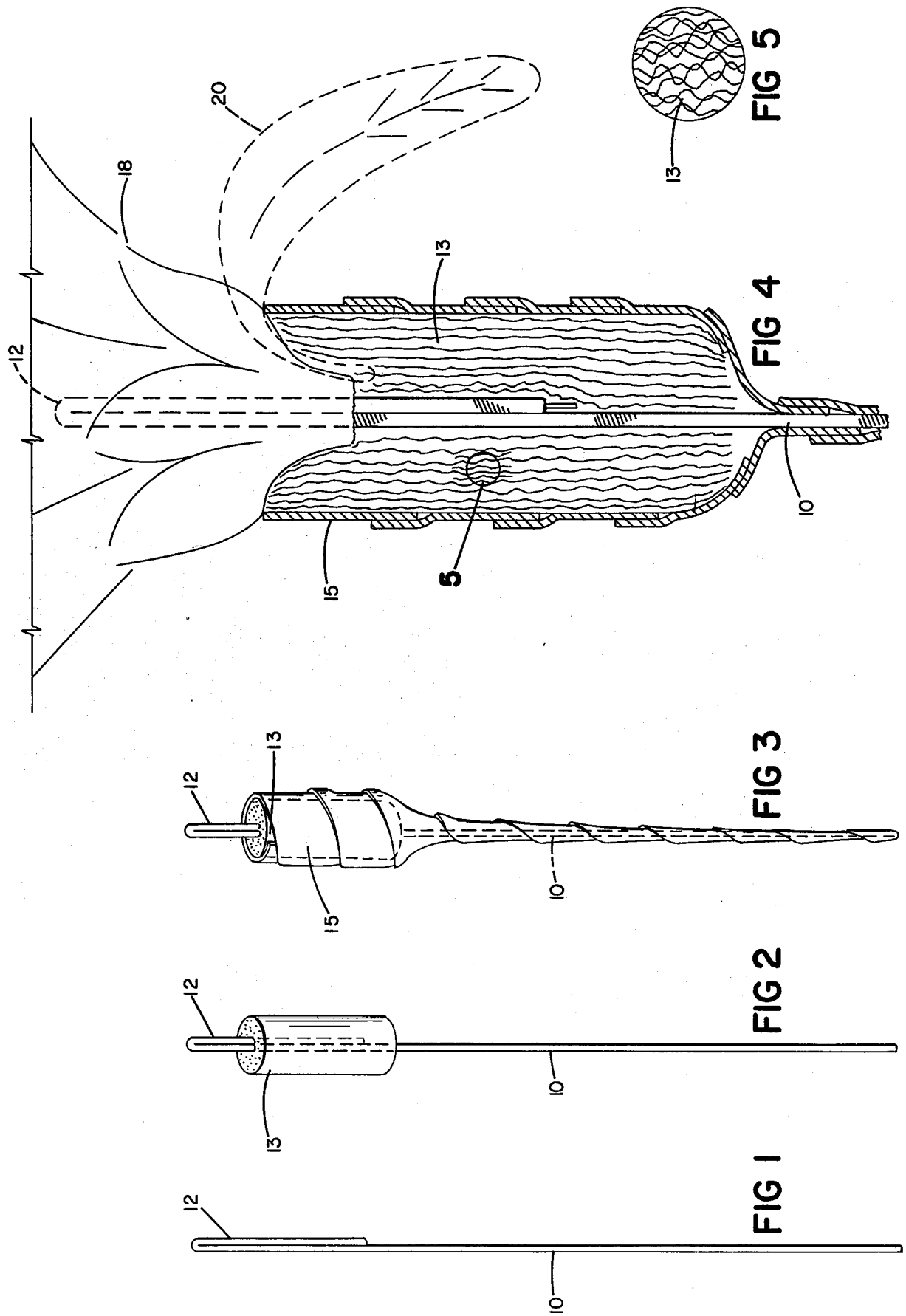

FRESH FLOWER HOLDER

This application is a continuation of application Ser. No. 337,539, filed Jan. 7, 1982 now abandoned.

FIELD OF THE INVENTION

This invention relates to holders for fresh flowers.

BACKGROUND OF THE INVENTION

Corsages are often made by impaling the severed end of a fresh flower with a wire holder. To keep the flower fresh for an extended period, it is known to add a moisture reservoir to the holder. My U.S. Pat. Nos. 3,150,462 and 4,281,474 (both hereby incorporated by reference) describe holders with such moisture reservoirs; cotton is wrapped around a textile-covered stem and covered by an outer coating of water-repellent adhesive tape.

Artificial stems for flowers used in floral arrangements have been made by doubling and twisting a length of wire which has been wound with a textile covering (such as described in my U.S. Pat. No. 3,553,889, hereby incorporated by reference).

SUMMARY OF THE INVENTION

I have discovered a fresh flower holder that is less expensive to manufacture yet better at preserving flowers than the holders of my two previous patents mentioned above. In general, my invention features the use of a moisture-absorbent fibrous plug in which fibers are predominantly oriented parallel to the covered wire on which the flower is impaled. This parallel or lengthwise orientation of the fibers helps permit insertion of the severed end of a flower into the fibrous plug, thereby providing a more secure connection between the plug and the flower. The result is that moisture transfer from the plug to the flower is not interrupted by a slight movement of the flower away from the moisture reservoir, because contact is maintained between the severed end of the flower and the plug even after such a slight movement has occurred.

In preferred embodiments, the fibers are also crinkled in shape so as to have many short bends or turns and thereby form many small water-retaining cavities between fibers and thereby provide radial resilience which better permits the fibers to spread radially outward from the center of the plug when the severed end of the flower is inserted at the center and which gives the fibers a radially-inward restoring tendency that grips the inserted end of said flower to keep the flower from breaking its moisture-supplying contact with the plug.

The invention has the additional advantages of (1) permitting a separate piece foliage to be inserted into and held by the fibrous plug, (2) not being subject to the flower end of the plug being accidentally closed by improper adhesive tape installation, as could happen with the holder of my U.S. Pat. No. 4,281,474, and (3) permitting the moisture-absorbing plug to be simply slid onto the wire rather than more expensively wrapped on as in my prior holders.

Other advantages and features of the invention will be apparent from the following description of the prefered embodiments thereof, and from the claims.

PREFERRED EMBODIMENT

The structure and use of a preferred embodiment of my invention will now be described, after first briefly describing the drawings.

FIG. 1 is a perspective view illustrating the first step in the manufacture of the flower holder in which a stiff wire of small gauge, which has been wound about with a textile covering, is bent double.

FIG. 2 is a perspective view illustrating a further step in the manufacture in which a plug of absorbent fibers has been passed over the bent-double end of the wire.

FIG. 3 is a perspective view of the holder with an outer water-repellent wrapping added.

FIG. 4 is an enlarged sectional view of the absorbent plug end of the holder with the base of a flower in place.

FIG. 5 is an enlargement of a portion of the absorbent plug showing the shape and orientation of the fibers.

The flower or bud holder illustrated in the drawings includes a length of stiff millinary wire 10 (i.e., wire wound with a textile covering) partially bent double at 12, an absorbent plug 13 of acetate fibers surrounding the bent-double end 12, and a water repellent adhesive tape 15 wound around plug 13 and down the length of wire 10.

Plug 13 is roughly 0.25 inches in diameter and 0.875 inches in length and consists of non-woven acetate fibers which extend predominantly lengthwise within the plug but which (as illustrated in FIG. 5) are also crinkled in shape rather than straight. This crinkled shape, which gives the fibers many short bends or turns, provides small internal cavities within the plug for storing moisture and provides radial resilience for gripping the severed end of a flower impaled on the holder. The plug can be cut to desired length from longer rods of such fibers.

Adhesive tape 15 is wound so that it extends to the edge of or just beyond the flower end of plug 13 so as to hide the plug from view when a flower is installed. The tape provides a water-tight cover for plug 15 and also serves to bind together plug 13 and wire 10.

Bent over portion 12 of wire 10 extends into but not beyond the moisture reservoir, thereby leaving only a single thickness of wire extending below the moisture reservoir. A single thickness is preferred because it is more easily bent when attaching the corsage. The bent-double end 12 passes easily through plug 13; because of the bent-double configuration, there is no tendency for the textile wrapping to come off when the wire is passed through the plug.

When a flower or bud 18 is impaled on bent-double end 12 of wire 10, the base or severed end 17 of the flower is inserted a small distance into plug 13. The lengthwise orientation and the crinkled shape of the fibers give the fibers a radial or transverse resilience which permits the fibers to spread radially outward from the center of the plug when the severed end of the flower is inserted at the center and which gives the fibers a radially-inward restoring tendency that grips the inserted end of the flower to keep the flower from breaking its moisture-supplying contact with the plug. Because the base of the flower has been inserted a small distance into the plug, some separating movement can be tolerated without breaking that contact.

Prior to use the holder is immersed in water until plug 13 is saturated. In order to impale the flower 18 upon bent-double end 12 and insert it into plug 13, the holder is grasped firmly at a point immediately below the base of plug 13 and the bent end 12 is forced into the severed end 17 of the flower and up into the flower. The ability of the fibers of plug 13 to spread transversely also permits insertion of a piece of foliage 20 to enhance the appearance of the corsage.

Other embodiments of the invention are within the following claims.

What is claimed is:

1. In a holder for at least one element of living corsage material from which substantially the entire stem has been severed, said holder including a covered wire, a portion of absorbent material surrounding an intermediate portion of the covered wire to form a moisture reservoir, and a water-repellent covering surrounding said absorbent material and extending down said wire, the improvement wherein said absorbent material comprises a plug of random fibers of synthetic material organized generally uniformly in density throughout the plug in which the fibers extend predominantly parallel to said covered wire, whereby said fibers are capable of spreading generally radially outward to permit insertion of the severed end of said living material into said plug and are capable of providing a radially-inward restoring tendency so as to keep said material from breaking its moisture-supplying contact with the plug, and whereby said fibers are capable of being spread transversely at a location spaced from said wire to permit insertion and retention of a second element of living corsage material such as a piece of foliage.

2. The holder of claim 1 wherein said water-repellent covering extends to the end of or slightly beyond said absorbent material in the direction of said corsage material, whereby said absorbent material is concealed when said flower is impaled upon the holder.

3. The holder of claim 1 wherein said water-repellent covering comprises an adhesive tape wound around said absorbent material and wire.

4. The holder of claim 1 wherein said fibers are crinkled in shape so as to form many small water-retaining cavities between fibers and thereby provide radial resilience which permits the fibers to spread radially outward from the center of the plug when the severed end of said flower is inserted at said center and which gives the fibers a radially-inward restoring tendency that grips the inserted end of said corsage material to keep the flower from breaking its moisture-supplying contact with the plug.

5. The holder of claim 1 wherein said covered wire comprises a wire about which is wound a textile covering, said textile-wound wire is bent over at the end on which said corsage material is to be impaled, and said plug of fibers is adapted so as to permit said bent-over textile wire to be passed through said plug in the fabrication of said holder.

6. The holder of claim 5 wherein the length of the doubled over portion of said textile-covered wire is less than the full length of said holder.

7. The holder of claim 6 wherein said doubled over portion extends only so far down said holder as to enter said moisture reservoir but not far enough to extend beyond said reservoir, thereby leaving a single wire for use in attaching the said holder.

8. The holder of claim 7, wherein said textile-covered wire extends in one piece the full length of said holder.

* * * * *